Figure 1:
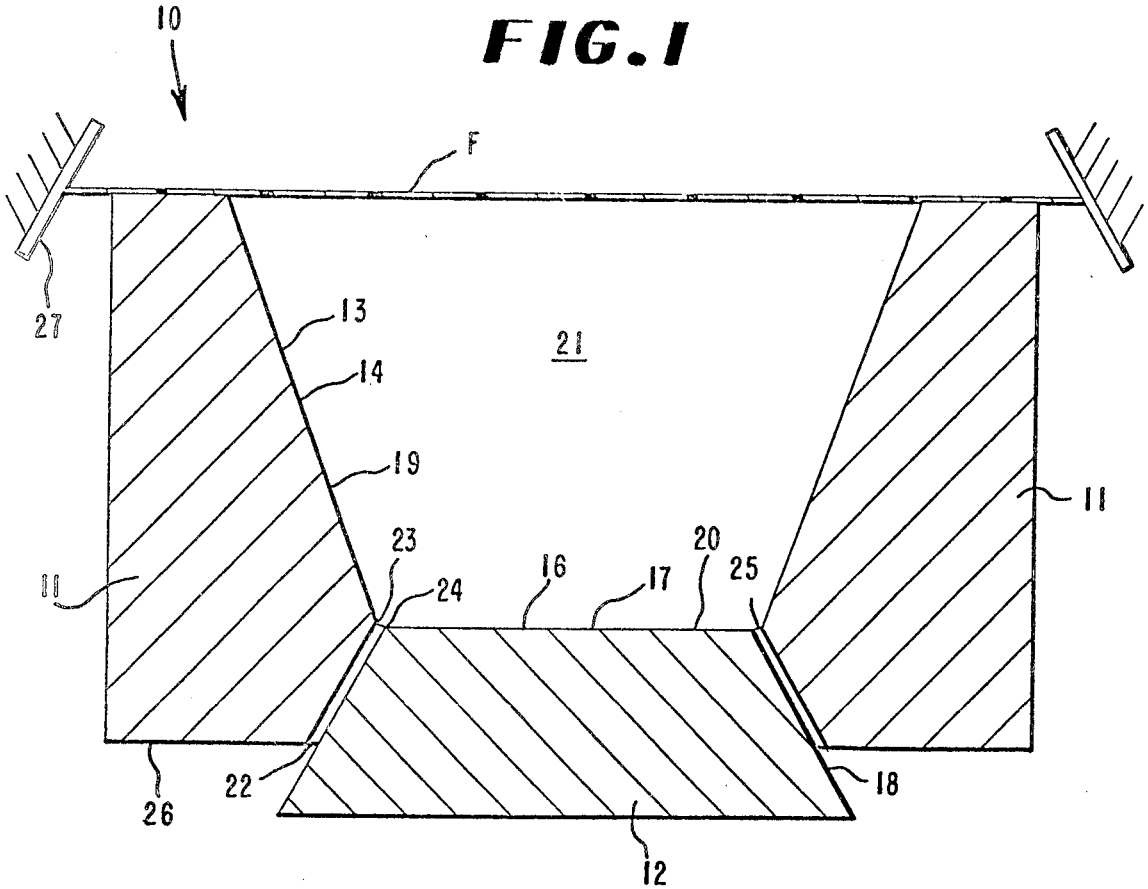
Figure 2:
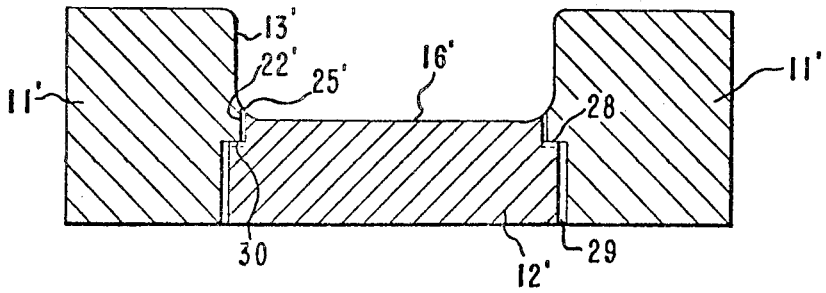

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 7

T946,002

MOLD AND METHOD OF THERMOFORMING USING SUCH MOLD

David Harris Berkebile, 611 Mowrer Road, Circleville, Ohio 43113

Continuation of application Ser. No. 455,804, Mar. 28, 1974, which is a division of application Ser. No. 333,530, Feb. 20, 1973, both now abandoned. This application Mar. 6, 1975, Ser. No. 555,999

Int. Cl. B29c *17/04*

U.S. Cl. 425—388

1 Sheet Drawing. 16 Pages Specification

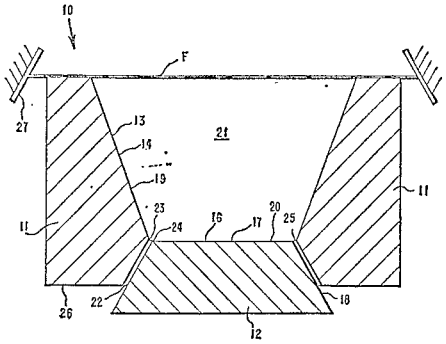

A mold 10 for vacuum thermoforming polyester film and having parts defining a cavity 21 including:

an outer body part 11 having an inner surface 13 with first portions 14 of such surface defining a cavity body surface 19;

an inner bottom part 12 having an inner surface 16 with first portions 17 of such surface defining a cavity bottom surface 20;

such cavity body and cavity bottom surfaces defining an inner surface of such cavity;

such body and bottom parts 11 and 12 being spaced from each other at the juncture of the lower circumferential edge 23 of the cavity body surface 19 and the upper circumferential edge 24 of the cavity bottom surface and defining an entrance 25 to a circumferential passageway 22 therebetween;

such entrance 25 to the passageway 22 being less than about 0.0003 inch wide at such juncture.

A method of thermoforming is provided using this mold.

MOLD AND METHOD OF
THERMOFORMING USING SUCH MOLD

Original Filed March 6, 1975